Inventor
Hans H. Hosenthien

By G. J. Kessenich + J. H. Church
Attorneys

Inventor
Hans H. Hosenthien

By G. J. Kessenich + J. H. Church
Attorneys

Inventor
Hans H. Hosenthien

By G. J. Kessenich & J. H. Church
Attorneys

Hans H. Hosenthien,
*INVENTOR.*

*BY*
G. J. Kessenich & J. H. Church
ATTORNEYS

Nov. 22, 1960 H. H. HOSENTHIEN 2,961,610

REFLECTED NONLINEAR MODULATORS IN ALTERNATING CURRENT ELECTRICAL ANALOG COMPUTERS

Filed Aug. 18, 1949 5 Sheets-Sheet 5

Inventor
Hans H. Hosenthien

By G. J. Kessenich & J. H. Church
Attorneys

United States Patent Office 2,961,610

Patented Nov. 22, 1960

2,961,610

REFLECTED NONLINEAR MODULATORS IN ALTERNATING CURRENT ELECTRICAL ANALOG COMPUTERS

Hans H. Hosenthien, Fort Bliss, Tex., assignor to the United States of America as represented by the Secretary of the Army Filed Aug. 18, 1949, Ser. No. 111,065

1 Claim. (Cl. 328—127)

(Granted under Title 35, U.S. Code (1952), sec. 266)

The invention described herein may be manufactured and used by or for the Government for governmental purposes without the payment of any royalty thereon.

My invention relates to alternating current electrical analog computer circuits using nonlinear modulators for demodulation of an amplitude modulated carrier signal in order to send it through an analog computing resistance-capacitance network, and for modulating the result upon the carrier after computation.

By computing network it is meant a network for interconverting between a first variable potential and a second variable potential which is the derived function of the first potential. In general if any signal to be computed, as for example, integrated, consists of the two side bands only, it can be represented by the product of two sinusoidal functions T and M, T having a higher frequency than M, T representing the carrier and M representing the modulation. Any nonlinear modulator controlled by the carrier frequency consists of an arrangement of nonlinear circuit elements alternately offering very low resistance to the input signal $T \cdot M$ for one half cycle of the controlling carrier voltage T and extremely high resistance for the following half cycle. The effect of a nonlinear modulator on an amplitude modulated carrier signal can be illustrated by a simplified example wherein a variable resistance $R(t)$ is subjected to an alternating current $I(t)$ with a carrier frequency $\omega_t$ and a frequency of modulation $\omega_m$. The alternating signal current $I(t)$ in the resistance causes a voltage drop $V_t$ across it which is proportional to the product $I_{(t)} \cdot R(t)$. Furthermore let $I(t)$ consist of the two side bands $\omega_t+\omega_m$ and $\omega_t-\omega_m$ and let $R(t)$ have the frequency $\omega_t$. Assuming sinusoidal functions or a harmonic composition of them for $I(t)$ and $R(t)$, the resulting $V(t)$ contains the frequencies $2\omega_t+\omega_m$ and $\omega_m$, the latter being the result of demodulation. For the purpose of modulation the process can generally be reversed. Let the signal current $I(t)$ contain the modulation frequency $\omega_m$ only, while $R(t)$ still contains $\omega_t$. Then the resulting modulated signal contains the two side bands $\omega_t+\omega_m$ and $\omega_t-\omega_m$ only. A nonlinear modulator is a physical or electronic analog of the resistor $R(t)$ and can be used to perform the same functions as $R(t)$.

Thus, for purposes of illustration the following nonlinear modulators are typical:

Nonlinear modulators using copper oxide, selenium, germanium, or diode rectifiers which are controlled by the carrier voltage.

Nonlinear modulators using relays instead of the rectifiers which are also operated by the carrier voltage.

Nonlinear modulators using switching gaseous tubes alternately ionized by a high frequency voltage which is modulated by a carrier frequency source, the ionizing high frequency being higher than the carrier frequency.

Nonlinear modulators using commutators or other mechanically operated contacts driven by synchronous motors operated or controlled by the carrier frequency source.

The common method of applying nonlinear modulators in alternating current analog computers, using resistance-capacitance networks for computation, is to place one nonlinear modulator controlled by T for the purpose of demodulation between the source delivering a two side band input signal $S_i=T \cdot M$ and the input of the computing resistance-capacitance network. Thus only the modulating signal M goes through the analog computing network. A second nonlinear modulator controlled by T at the output of the resistance-capacitance network modulates the computed modulating signal F(M) upon the carrier T in order to obtain the output alternating current signal $S_o=T \cdot F(M)$.

I have discovered a simplified method of applying nonlinear modulators in alternating current analog computers. Instead of using the common method which comprises a four terminal network consisting of the two nonlinear modulators, one each at the input and at the output of the computing resistance-capacitance network, I propose to combine the two nonlinear modulators into one and to use a two terminal computing resistance-capacitance network instead of a four terminal resistance-capacitance network, thus converting the common four terminal alternating current analog computer into a two terminal one.

Thus, one of the main objects of the invention is to provide an alternating current analog computing circuit comprising a two terminal network and using only one nonlinear modulator which is reflected in such a way that an alternating input current or voltage, amplitude modulated with a signal M to be computed goes through the nonlinear modulator into the computing resistance-capacitance network causing there a voltage drop or current respectively which is proportional to the computed signal F(M) which in turn is reflected through the same nonlinear modulator and appears at its two input terminals as an alternating voltage or alternating current respectively, modulated with the computed signal F(M).

Another important object of the invention is to provide an alternating current analog computing circuit using only one reflected nonlinear modulator possessing thereby a nonlinear computing impedance between its two terminals making a convenient application in negative feedback alternating current amplifier circuits possible.

Another object of the invention is to provide an alternating current analog computing circuit which reduces the number of nonlinear components by the use of one reflected nonlinear modulator only, therefore increasing accuracy, reliability, and simplicity.

Still another object of the invention is to provide an alternating current analog computing circuit using one reflected nonlinear modulator in negative feed-back alternating current amplifier circuits which allow compensations of error terms in the computed alternating current signal. These compensations can be realized in a very convenient way by means of resistance or impedance summing networks.

The novel features which I believe to be characteristic of my invention are set forth in particularity in the appended claim; the invention itself, however, as to both its organization and method of operation will be best understood by reference to the following description taken in connection with the drawings in which I have indicated diagrammatically several circuit organizations whereby my invention may be carried into effect.

In the drawings,

Figure 1 diagrammatically shows for comparison purposes a circuit of a common electronic alternating current integrator not applying the invention.

Figure 5:
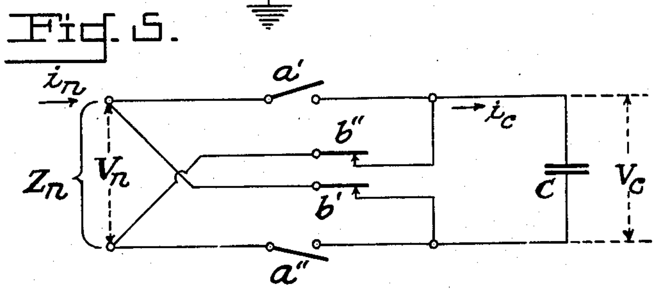
Figure 5 shows a basic reflected modulator circuit for alternating current integration.
Figure 7:
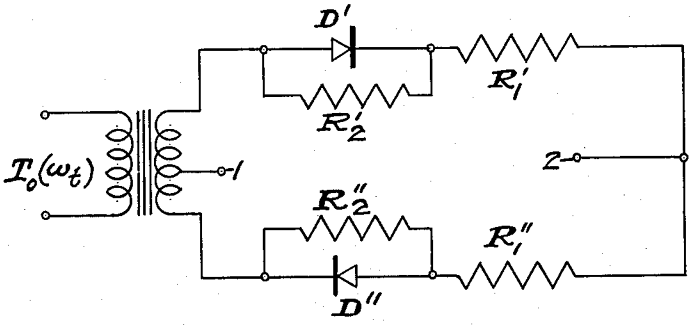
Figure 7 represents a practical reflected modulator circuit using electronic switching means.
Figure 7A:
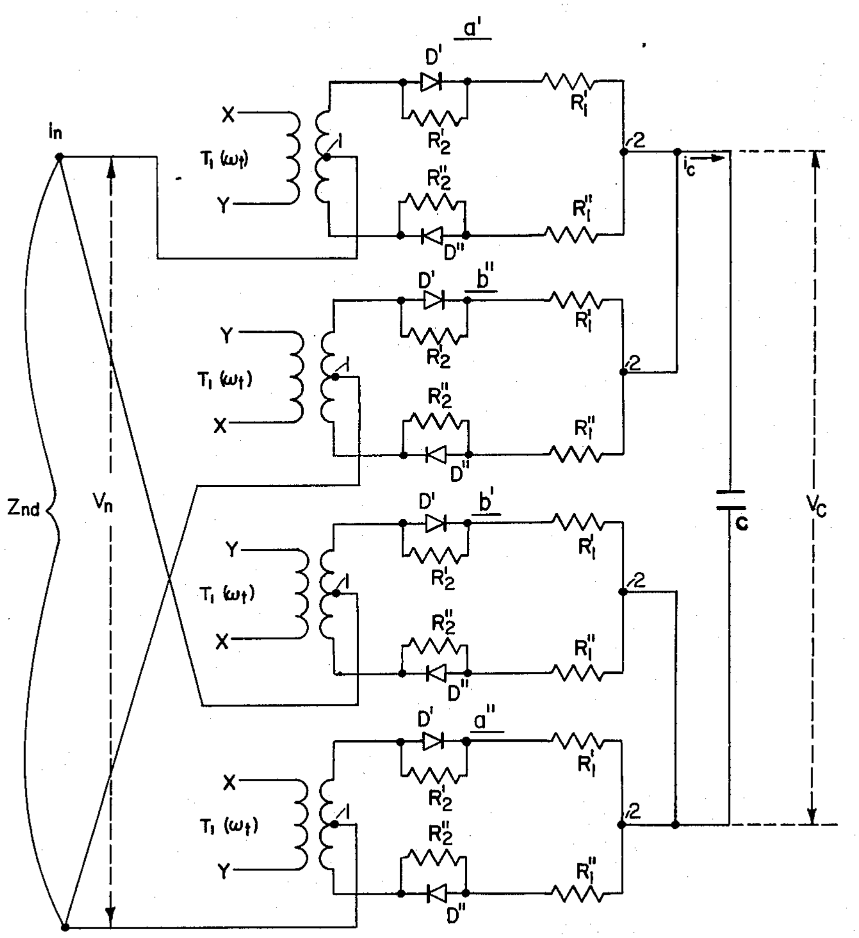

Figure 7*a* illustrates the substitution in Figure 5 of the switches shown by Figure 7.

Figure 8:
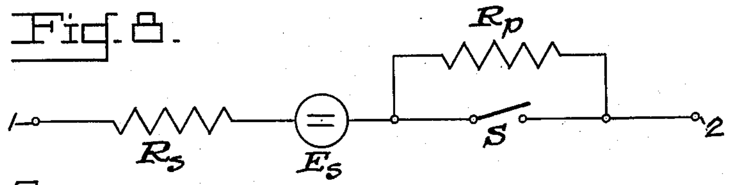

Figure 8 represents an equivalent circuit diagram for Figure 7.

Figure 9:
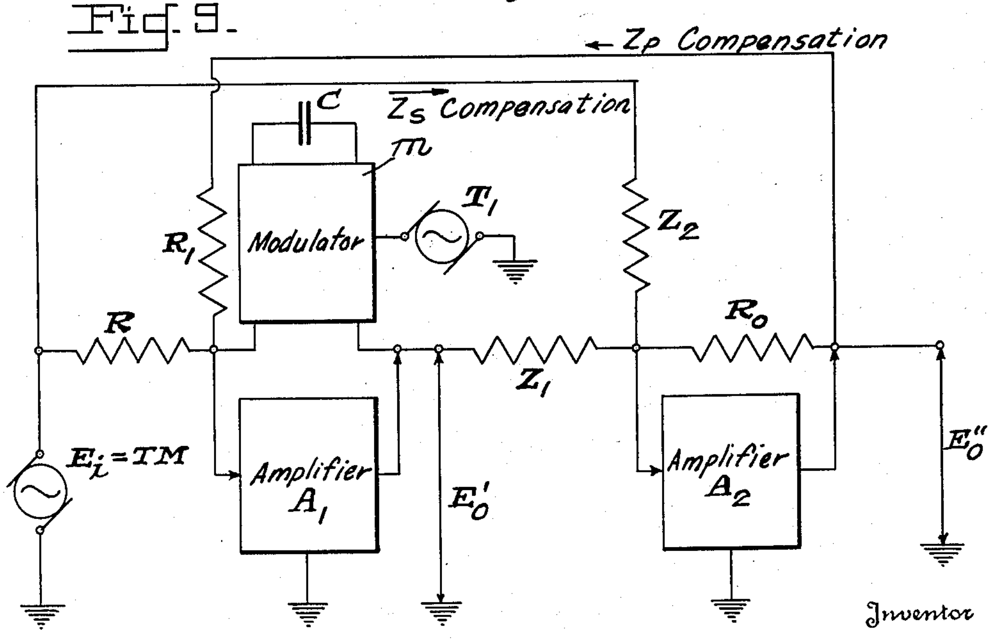

Figure 9 shows an electronic alternating current integrating circuit embodying the invention.

Figure 10:
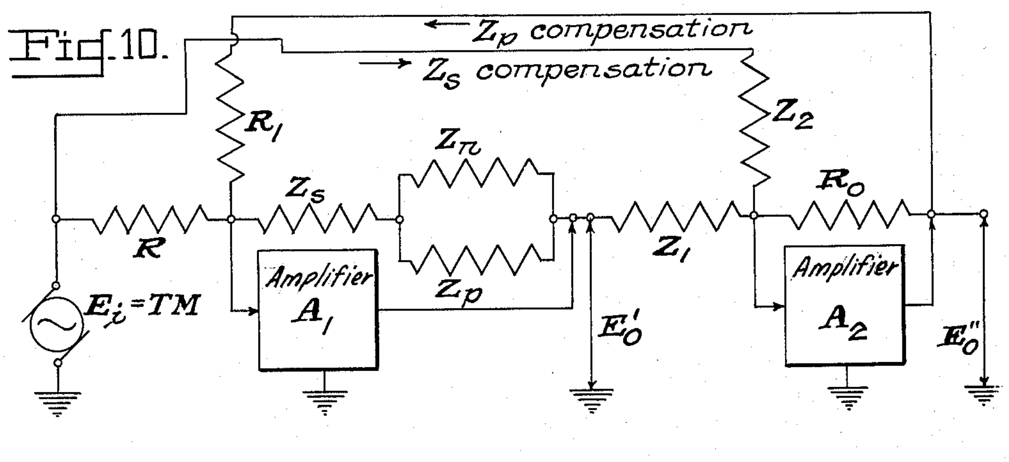

Figure 10 represents an equivalent circuit for Figure 9.

Figure 1:
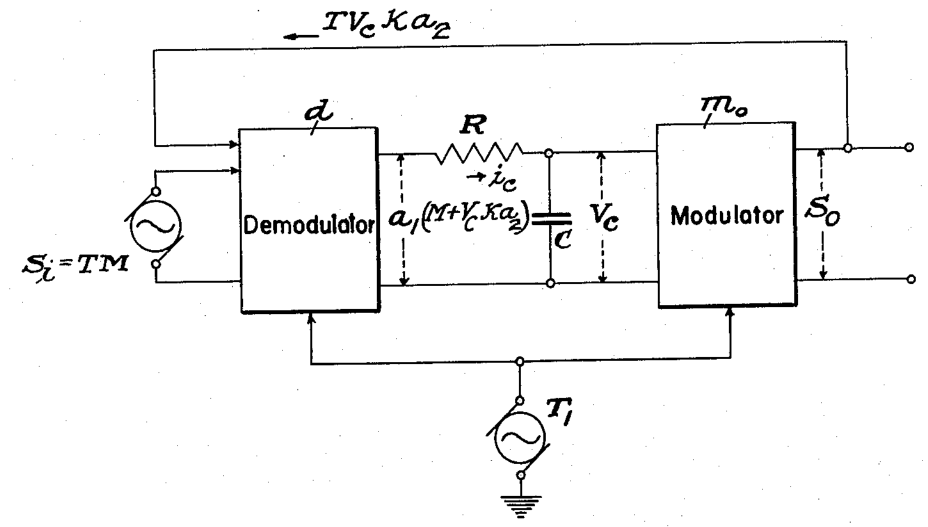

By reference to an example of an electronic alternating current integrating device the features and the operation of the new method will be demonstrated. In the accompanying drawings Figure 1 represents the basic circuit diagram of a conventional electronic alternating current integrator consisting of two electronic amplifiers, two nonlinear modulators for demodulation and modulation respectively, the resistor R, the integrating condenser C, the carrier source $T_1$ controlling $d$ and $m_0$, and the positive feed-back loop. The carrier source $T_1$ also furnishes the carrier frequency for the amplitude modulated input signal $S_i$ so as to maintain the proper frequency and phase relationships necessary for computer circuits. For the purpose of simplified illustration one amplifier and a modulator $m$ are combined in the box $d$ to represent the demodulator and the other amplifier and a modulator $m$ are combined in the box $m_0$ to represent the modulator to simplify calculation the demodulator $d$ and the modulator $m_0$ are assumed being perfect. C is assumed having no losses and $m$ is assumed to offer infinite input impedance, i.e. no load to C. The amplification of demodulator $d$ and modulator $m_0$ are represented by the reference numerals $a_1$ and $a_2$ respectively. The input signal $S_i=T\cdot M$ and the positive feed-back signal $TV_cka_2$ are applied to the input of $d$, $V_c$ representing the voltage across the condenser C, $k$ being the feed-back factor and $a_2T$ representing the effect of $m_0$ on the voltage $V_c$, hereafter called the transfer constant of $m_0$ with respect to $V_c$. The transfer constant of demodulator $d$ is $$\frac{a_1}{T}$$

therefore, $d$ demodulates the input signal into $$a_1(M+V_cka_2)$$

which represents the electromotive force in the integrating resistance-capacitance section. The charging current $i_c$ can be represented by the equation (1) $$i_c=\frac{a_1M+V_cka_1a_2-V_c}{R}$$

With properly adjusted feed-back (2) $$ka_1a_2=1$$

Substituting Equation 2 in Equation 1

(3) $$i_c=a_1\frac{M}{R}$$

$V_c$ can be represented by the general capacitor equation (4) $$V_c=\frac{1}{C}\int i_c dt$$

Substitution of Equation 3 in Equation 4 achieves perfect integration of the modulation M resulting in the equation (5) $$V_c=\frac{a_1}{RC}\int Mdt$$

The output signal of the electronic alternating current integrator can consequently be expressed as (6) $$S_o=Ta_2V_c=T\frac{a_1a_2}{RC}\int Mdt$$

Figure 2:
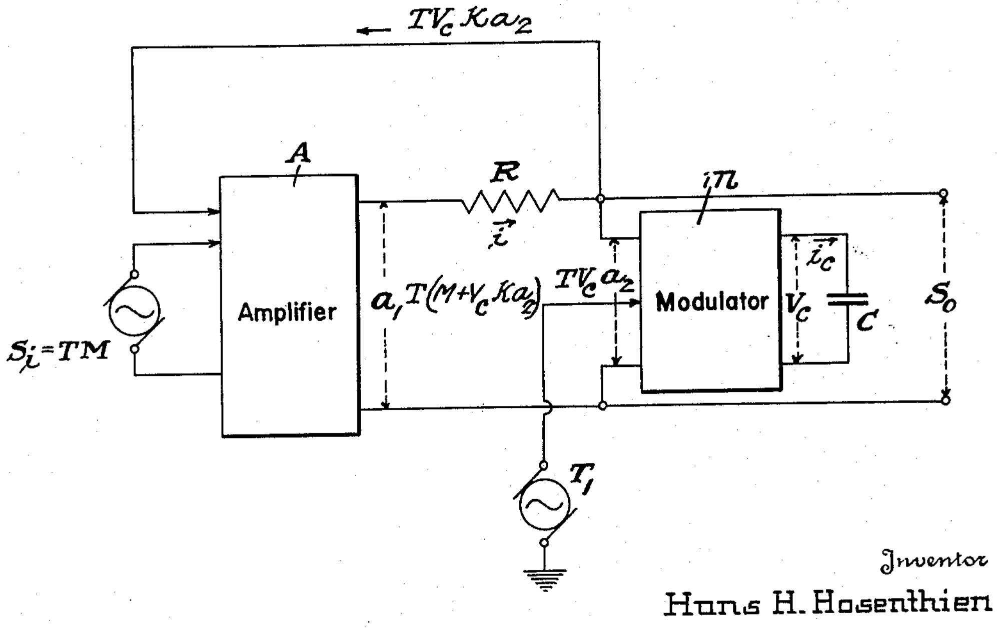
Figure 2 shows the invention applied to an electronic alternating current integrator circuit.
Figure 3:
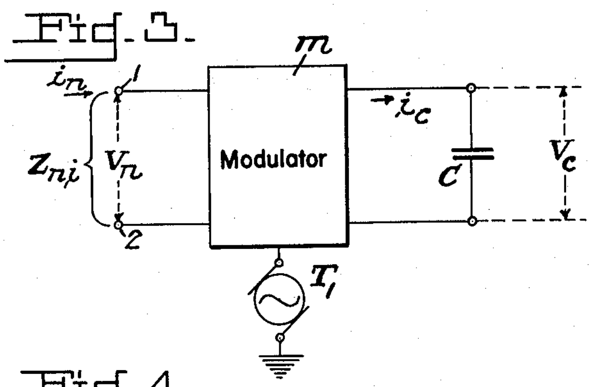
Figure 3 represents an electrical analysis of the invention applied to an alternating current integrating two terminal network.

Applying the new method of my invention, Figure 3 shows an electronic alternating current integrator which uses only one nonlinear modulator. The circuit of Figure 2 consists of the summing amplifier A with an amplification $a_1$, the resistor R, the nonlinear modulator $m$ with an amplification $a_2$ and controlled by the carrier source $T_1$, the integrating condenser C, and the positive feed-back loop. The input signal $S_i=T\cdot M$ and the feed-back signal $TV_cka_2$ are fed into the summing amplifier A which in turn provides the electromotive force $$a_1T(M+V_cka_2)$$

for the integrating section. Let $a_2T$ be the transfer constant of $m$ with respect to the condenser voltage $V_c$. The modulated condenser voltage at the input of $m$ becomes $a_2TV_c$. The current through R can be indicated as (7) $$i=\frac{T}{R}(Ma_1+V_cka_1a_2-a_2V_c)$$

With properly adjusted positive feed-back (8) $$ka_1=1$$

and the reaction of the condenser voltage upon $i$ can be compensated. With the use of Equation 8, Equation 7 can be rewritten as (9) $$i=\frac{Ta_1}{R}M$$

Let $$\frac{a_3}{T}$$

be the transfer constant of $m$ with respect to $i$ so that

(10) $$i_c=\frac{a_3}{T}i$$

The demodulated current $i_c$ can be expressed as

(11) $$i_c=\frac{a_1a_3}{R}M$$

From Equation 11 and the general condenser equation

(12) $$V_c=\frac{1}{C}\int i_c dt$$

the condenser voltage becomes

(13) $$V_c=\frac{a_1a_3}{RC}\int Mdt$$

and the output voltage (13*a*) $$S_o=a_2TV_c=T\frac{a_1a_2a_3}{RC}\int Mdt$$

The Equations 13 and 13*a* represent true integration.

The example given in Figure 2 leads to the definition of the two terminal network of Figure 3 consisting of the nonlinear modulator $m$ controlled by the carrier source $T_1$ and the integrating condenser C. This two terminal network offers a computing impedance $Z_{ni}$ between its terminals 1 and 2. The definition of $Z_{ni}$ is based upon the assumption of any nonlinear modulator for which the following equations between voltages and currents hold true for the fundamental frequency of the carrier where $a_i$ is the current gain of $m$ and $a_v$ is the voltage gain of $m$:

(14) $$i_c=i_n\frac{a_i}{T}$$

(15) $$V_n=V_ca_vT$$

Circuits for nonlinear modulators of this type will be given below. From Equations 14, 15, and $$(16)\qquad V_c=\frac{1}{C}\int i_o dt$$

along with the input current equation $$(17)\qquad i_n=T\cdot M$$

the expression for $Z_{ni}$ becomes $$(18)\qquad Z_{ni}=\frac{V_n}{i_n}=\frac{a_i a_v}{C}\frac{\int M dt}{M}$$

Figure 4:
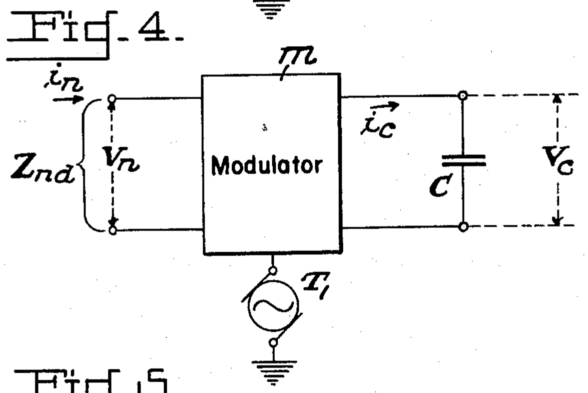
Figure 4 represents an electrical analysis of the invention applied to an alternating current differentiating two terminal network.

Analogous to $Z_{ni}$ for integration I define a computing impedance $Z_{nd}$ for differentiation according to Figure 4. $Z_{nd}$ can be derived from Equations 14, 15, 16, and the input voltage $$(19)\qquad V_n=T\cdot M$$

This derivation leads to the equation $$(20)\qquad Z_{nd}=\frac{V_n}{i_n}=\frac{a_i a_v}{C}\frac{M}{\frac{dM}{dt}}$$

If M is sinusoidal, the representation of M by a rotating complex vector $$(21)\qquad M=M_o\cdot e^{j\omega_m t}$$

and the proper substitution of this equation in Equations 18 and 20 will transform both $Z_{ni}$ and $Z_{nd}$ into one impedance $$(22)\qquad Z_n=\frac{a_i a_v}{j\omega_m C}$$

A further generalization of Equation 22 results from the general assumption of a complex two terminal resistance-capacitance network instead of a single computing condenser C. With the impedance of this general computing two terminal network for the modulating frequency $\omega_m$ the general formula yields $$(23)\qquad Z_n=\frac{a_i a_v}{Z(\omega_m)}$$

Figure 6:
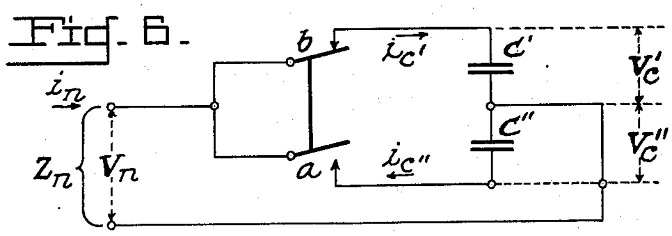
Figure 6 shows another basic reflected modulator circuit for alternating current integration.

Figure 5 and Figure 6 show practical modulator circuits for pure integration using switches controlled by the carrier which alternately open and close for the half cycles of the carrier. In Figure 5 *a'* and *a''* are open while *b'* and *b''* are closed and vice versa. The principle of Figure 5 is commutation of the two terminals of the computing condenser C. The principle of Figure 6 is charging two equal condensers C' and C'' alternately, for instance charging C' by all positive half cycles of the modulated carrier and charging C'' by all negative half cycles of the modulated carrier. The charging process in Figure 5 corresponds to full wave synchronous rectification, while in Figure 6 half wave synchronous rectification takes place. The transfer constants for the currents may be derived therefrom. Such a derivation by the use of the general nonlinear modulator equations as previously set forth provides voltages which are the integral of the input currents.

If because of rather high carrier frequency, mechanical switching devices become impractical, the switches in both Figure 5 and Figure 6 can be replaced by an arrangement as shown in Figure 7, consisting of diode or other rectifiers in which the ratio of backward to forward resistance is sufficiently high, controlled by a square wave voltage containing $\omega_t$ as the fundamental frequency, the terminals 1 and 2 of Figure 7 being connected across the terminals of a switch, *a'*, *a''*, *b'* or *b''* of Figure 5 or switch *a* or *b* of Figure 6. One circuit as shown in Figure 7 would, of course, be employed in place of each of the switches of Figures 5 and 6. The synchronizing potential applied to the transformer input of each of the switches illustrated by Figure 7 would be poled to produce a combination of open and closed switch conditions, alternately changing, as illustrated in Figures 5 and 6. Four switches of the type shown by Figure 7 are substituted for switches *a'*, *a''*, *b'* and *b''* of Figure 5 in the composite of Figures 5 and 7 illustrated by Figure 7*a*. Switches *a'* and *a''* are phased opposite to those of *b'* and *b''* as indicated by the reverse position of terminals *x* and *y*. Figure 8 represents the equivalent circuit for Figure 7 as far as the switching operation between the terminals 1 and 2 is concerned. The rectifiers D' and D'' in Figure 7 become low resistive for one half cycle of T and high resistive for the next half cycle of T. Figure 7 represents a bridge circuit which is adjusted for one half cycle of T by $R_1'$ and $R_1''$ when the diodes are conducting and essentially shortening out $R_1'$ and $R_2''$, and for the next half cycle of T by $R_2'$ and $R_2''$ when the diodes are not conducting since $R_2'$ and $R_2''$ are of greater magnitude than $R_1'$ and $R_1''$. The equivalent circuit of Figure 8 comprises $R_s$ as a series resistance being merely the equivalent for $R_1'$ and $R_1''$ in series with the forward resistances of the rectifiers, $E_s$ the error voltage of the bridge, $R_p$ the equivalent for $R_2'$ and $R_2''$ parallel to the backward resistances of the rectifiers, and the switch S representing the control action of the square wave carrier source.

Generally in practical cases there will occur a series impedance $Z_s$ and a parallel impedance $Z_p$ together with $Z_n$ defined above. $Z_s$ is the equivalent impedance resulting in the nonlinear modulator from transformer leakage inductance or from resistance in series with the nonlinear modulating elements in the low resistive phase. $Z_p$ is the equivalent impedance resulting in the nonlinear modulator from transformer mutual inductance and from the resistance of the nonlinear modulating elements in the high resistive phase. In practical circuits the impedances $Z_s$ and $Z_p$, except their fluctuations, can be compensated by the operating carrier frequency.

Two examples are shown in Figure 9 and Figure 10 of an electronic current integrator. The electronic alternating current integrator circuit, Figure 9, consists of the two summing amplifiers $A_1$ and $A_2$ with negative feed-back, the reflected modulator *m*, the integrating condenser C, and two loops for compensation of $Z_s$ and $Z_p$. Figure 10 shows the equivalent circuit of Figure 9. In order to simplify the following calculation of the arrangement of Figure 10 the gain of $A_1$ and $A_2$ is assumed to be infinite. The term $$\frac{a_i a_v}{C}$$

may be substituted by a fictitious capacity $$(24)\qquad C'=1\Big/\frac{a_i a_v}{C}$$

The two nodal equations for the summing networks are $$(25)\qquad E_o'=\frac{-E_i}{R}\left(Z_s+\frac{1}{\frac{1}{Z_n}+\frac{1}{Z_p}}\right)-\frac{E_o''}{R_1}\left(Z_s+\frac{1}{\frac{1}{Z_n}+\frac{1}{Z_p}}\right)$$

$$(26)\qquad E_o''=-E_o'\frac{R_0}{Z_1}-E_i\frac{R_0}{Z_2}$$

With the 3 equations:

$$(27)\qquad R_1=Z_p$$

$$(28)\qquad Z_1\frac{R_1}{R_0}=Z_s+Z_p \text{ for } Z_p \text{ compensation}$$

$$(29)\qquad Z_1\frac{R}{Z_2}=Z_s \text{ for } Z_s \text{ compensation}$$

the solution of the Equations 25 and 26 for $E_o''$ becomes $$(30)\qquad E_o''=E_i\frac{Z_n}{R}=\frac{T\cdot M}{j\omega_m C' R}$$

which represents true integration of M with respect to time.

Further, while I have indicated and described several arrangements for carrying my invention into effect, it will be apparent to one skilled in the art that my invention is by no means limited to the particular organizations shown and described, but that many modifications may be made without departing from the scope of my invention as set forth in the appended claim.

What I claim is:

An apparatus for integration of the modulation on an amplitude modulated carrier source comprising a synchronous rectifying nonlinear modulator actuated by a rectangular wave switching potential of the same frequency as said carrier, a first amplifier, the input of said modulator being connected between the input and output of said amplifier, the output of said modulator being connected across a capacitor, said modulated carrier being connected to the input of said first amplifier through a first electrical resistance element, a second amplifier, a first impedance element being connected between the output of said first amplifier and the input of said second amplifier, a second impedance element being connected between said carrier source and the input of said second amplifier, a first feedback resistor being connected between the output of said second amplifier and the input of said first amplifier, a second feedback resistor connected between the output of said second amplifier and the input of said second amplifier, where the value of said first feedback resistor is substantially equal to the parallel impedance of said modulator, the value of said first impedance element multiplied by the ratio of the value of said first feedback resistor to the value of said second feedback resistor is substantially equal to the modulator series impedance plus the modulator parallel impedance, and the value of said first impedance multiplied by the ratio of the value of said first resistance element to said second impedance element is substantially equal to the modulator series impedance.

References Cited in the file of this patent

UNITED STATES PATENTS

| | | |
|---|---|---|
| 2,205,843 | Caruthers | June 25, 1940 |
| 2,248,250 | Peterson | July 8, 1941 |
| 2,251,973 | Beale et al. | Aug. 12, 1941 |
| 2,412,227 | Och et al. | Dec. 10, 1946 |
| 2,412,485 | Whitely | Dec. 10, 1946 |
| 2,519,223 | Cheek | Aug. 15, 1950 |
| 2,562,792 | James | July 31, 1951 |
| 2,567,691 | Bock et al. | Sept. 11, 1951 |
| 2,581,456 | Swift | Jan. 8, 1952 |
| 2,583,587 | Milsom | Jan. 29, 1952 |
| 2,661,152 | Elias | Dec. 1, 1953 |
| 2,695,988 | Gray | Nov. 30, 1954 |
| 2,700,135 | Tolles | Jan. 18, 1955 |